Dec. 6, 1955     L. E. ST. JEAN     2,726,384
AUTOMATIC FREQUENCY RESPONSE CONTROLS
Filed July 31, 1952
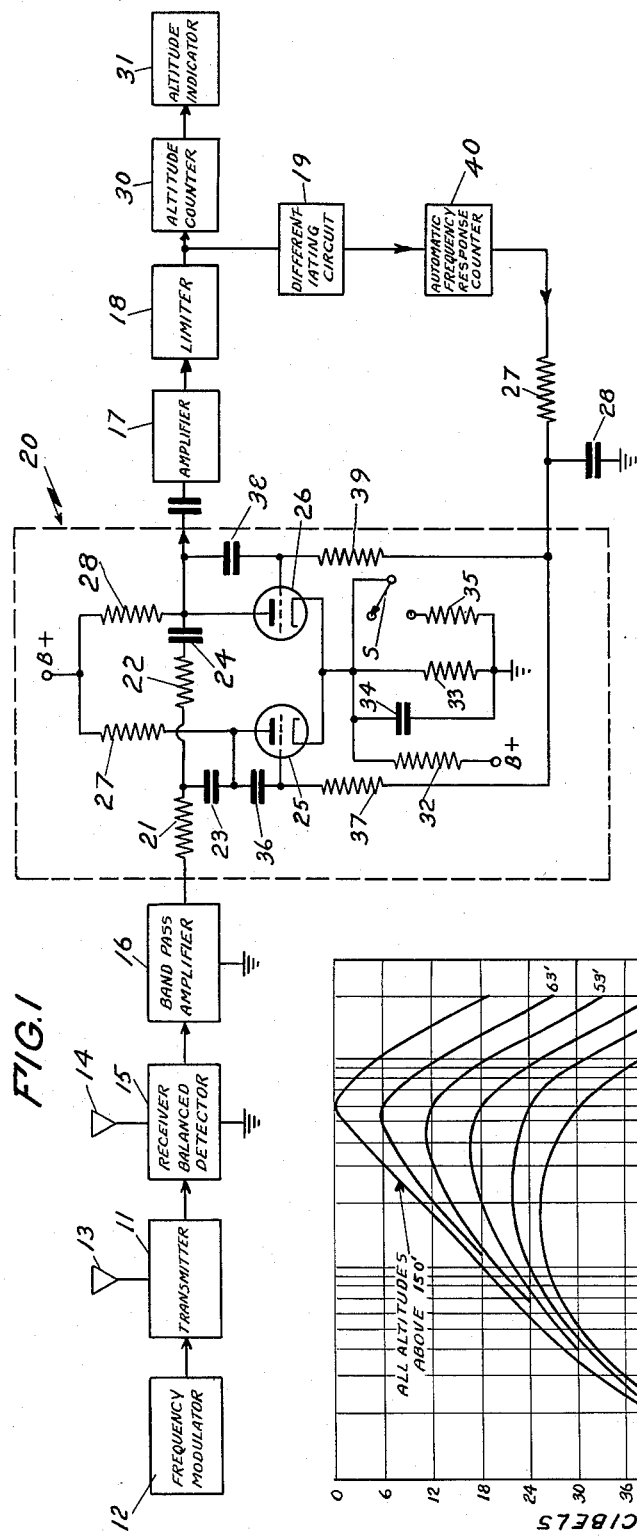
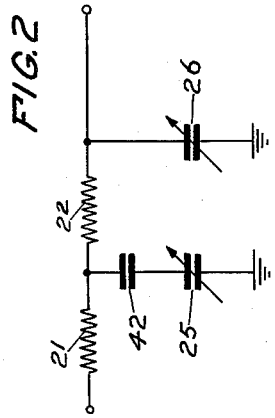
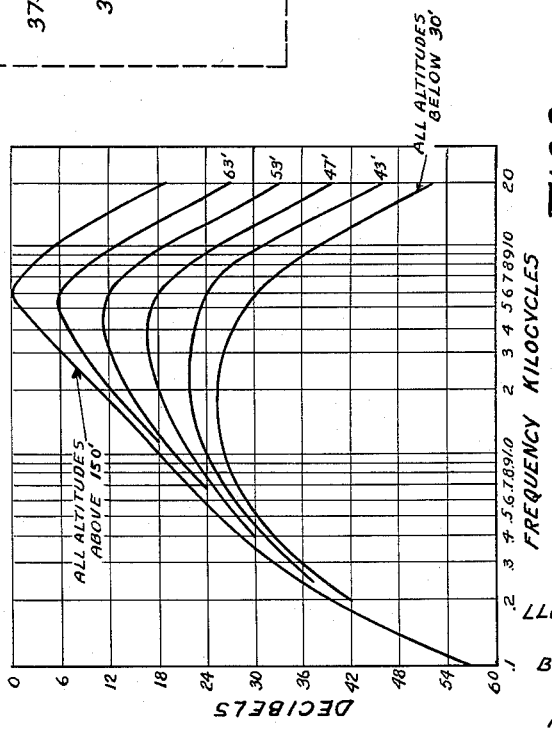
INVENTOR
LLOYD E. ST. JEAN
BY *Elmer J. Gorn*
ATTORNEY United States Patent Office 2,726,384
Patented Dec. 6, 1955

2,726,384

AUTOMATIC FREQUENCY RESPONSE CONTROLS

Lloyd E. St. Jean, Arlington, Mass., assignor to Raytheon Manufacturing Company, Newton, Mass., a corporation of Delaware Application July 31, 1952, Serial No. 301,953

3 Claims. (Cl. 343—14)

This invention pertains to amplifier frequency response control circuits for substantially reducing the effect of spurious delay path signals, Doppler signals and interference signals in frequency modulated electronic altimeters.

An object of this invention is to control the frequency response of a filter circuit by means of a frequency counter.

Another object of this invention is to provide an amplifier having a variable filter for maintaining high attenuation slopes on the high frequency portion of the amplifier frequency response curve.

Still another object of this invention is to provide an amplifier circuit whose frequency response characteristic may be varied electronically in response to the frequency of a desired input signal.

A further object of this invention is to provide a frequency modulated aircraft altimeter having improved accuracy and reliability at low altitudes.

A further object of this invention is to provide a frequency modulated altimeter capable of substantial rejection of high frequency noise and high frequency spurious relay path signals while the aircraft is taking off, landing or flying at low altitudes.

Electronic altimeters use information having a wide dynamic range of signal strength since the transmission path varies from a few feet to several thousand feet. In an FM altimeter, altitude information is the audio difference frequency between the transmitted and received signals caused by the time delay over the transmission path which is twice the altitude. Over at least the lower portion of the altitude range the transmitter sweep width is held constant and the difference frequency varies directly with altitude and thus is inversely proportional to signal strength. It has, therefore, become standard practice to use frequency compensation to cope with the problem of extreme variation in signal strength. The compensation normally employed has a transfer function with a rising slope of six db per octave from the lowest frequencies to the highest frequency expected for the fixed transmitter frequency deviation. Beyond the point of maximum gain, attenuation is introduced at the rate of approximately twelve to eighteen db per octave to discriminate against undesirable high frequency noise.

At low altitudes there are several factors which tend to cause errors in the altitude indications. At very low altitudes, there may be discrete reflectors, such as buildings, mountains, trees and so forth, within the beam capture area having a longer delay path than the altitude. Another source of spurious high frequency signals is the Doppler effect occurring for strong reflectors not normal to the motion of the aircraft.

The frequency compensation previously referred to reduces the stronger low frequency direct altitude signal in comparison with the undesirable spurious high frequency signals, thereby masking the desired altitude signal and causing erratic altitude indications.

For reliable measurements of altitude below 150 feet, automatic frequency response control of the altimeter is employed. This automatic frequency response control may be achieved by inserting a multi-stage variable RC low pass filter in the altimeter amplifier circuit. The variable portion of the RC filter comprises reactance tubes which are simultaneously controlled by the average output of a frequency counter stage which output is proportional to the amplified difference frequency. This average output derived from the counter determines the operating point of the reactance tube. A low frequency beat signal produces a low negative voltage from the frequency counter to operate the reactance tubes at maximum transconductance and hence maximum effective capacitance. Conversely, a high frequency altitude signal increases the negative output from said counter and biases the reactance tube more heavily so that the effective capacity of said reactance tube is decreased. By means of this invention, therefore, the frequency response is adjusted to be as near optimum as possible for the desired received altitude signal.

In the drawings:

Fig. 1 is a block diagram, partly in schematic, of an embodiment of the subject invention;

Fig. 2 is an equivalent circuit of the filter shown in Fig. 1; and

Fig. 3 illustrates the frequency response characteristic obtained at various altitudes of the altimeter shown in Fig. 1.

Referring to Fig. 1, the frequency of transmitter 11 is cyclically varied by means of frequency modulator 12. A portion of the frequency modulated output from transmitter 11 is radiated from transmitting antenna 13 toward the terrain over which the aircraft is flying and, after reflection from said terrain, is received by receiving antenna 14 connected to an input circuit of balanced detector 15. Another portion of the output of transmitter 11 is fed directly to balanced detector 15. Detector 15 produces a beat signal output whose average frequency is the difference between said input frequencies and hence proportional to the distance between transmitter 13 and the terrain.

The beat frequency signal is fed to a band pass audio amplifier 16 designed to produce a frequency response characteristic when the indicated altitude is below 150 feet that rises approximately six db per octave up to the frequency corresponding to the altitude reading at 150 feet and then to fall off above this point.

The output of band pass amplifier 16 is applied to the input of a second amplifier 17 through a low pass RC filter 20 consisting of resistors 21 and 22, capacitors 23 and 24 and audio frequency response control tubes 25 and 26. Filter 20 reduces the high frequency gain of the system as a function of altitude when flying at altitudes between zero and 150 feet. The detailed operation of filter 20 will be described later. Capacitors 23 and 24, in addition to forming a part of RC filter 20, serve as blocking capacitors to isolate the plate supply from audio band pass amplifier 16.

Amplier 17 functions to amplify the audio beat frequency signal to a level suitable for operation of limiter 18. The amplitude limited output of limiter 18 is coupled to altitude counter 30 which is a frequency counter which develops a negative direct current voltage proportional to the frequency of the signal derived from limiter 18. Since the output of a frequency counter is also dependent upon the amplitude of the input signal, limiter 18 is necessary to insure that the direct current output voltage of frequency counter 30 varies only with frequency and, hence, with altitude.

Since frequency counter circuits are well known in the art, the details of counter 30 are omitted. An example of a counter which may be used in the system of the subject invention is shown and described on pages 231 to 233 of Radar Electronic Fundamentals, published on June 29, 1944, by the War Department, now unclassified. An altitude indicating device 31 is connected to altitude counter 30 and is calibrated directly in feet or other units of altitude.

The output of limiter 18 is also coupled through differentiating circuit 19 to an automatic frequency response control counter 40 which, like counter 30, develops a negative voltage proportional to the frequency of the output voltage derived from limiter 18. Not only should the signals applied to counting circuit 40 be of constant amplitude, but said signals must be of the same time duration if accurate counting is to be attained. In other words, the pulse repetition frequency is to be the only variable. Differentiating circuit 19, therefore, has a time constant which is short compared with the period of the highest frequency signal to be counted so that negative input pulses to counter 40 are of substantially uniform width. The negative output of counter 40, which is dependent only upon beat frequency, is supplied to an integrating circuit comprising resistor 27 and capacitor 28; this integrating circuit smoothes out the pulsations in the counter output signal, thereby providing a voltage whose average value is a function of the difference frequency. This voltage derived from the integrating circuit is applied to the input or grid circuits of the two electron discharge devices 25 and 26 whose anodes are connected to a plate supply through plate resistors 27 and 28, respectively. The tubes 25 and 26, although shown as triodes, may be pentodes or other electron discharge devices having a comparatively large mutual conductance. A fixed bias is applied to tubes 25 and 26 by returning their cathodes to ground through a voltage divider consisting of resistors 32 and 33 connected across the plate supply. A by-pass capacitor 34, whose capacitance is large compared with the equivalent capacitance of reactance tubes 25 and 26, is connected in shunt with resistor 33.

When the indicated altitude is below 150 feet, switch S connects resistor 35 in parallel with resistor 33 making the actual bias voltage applied to tubes 25 and 26 comparatively small. Above 150 feet indicated altitude, the transmitter frequency deviation of the altimeter is varied automatically to maintain the difference or beat signal constant, so that the latter is held constant at the maximum gain point of the compensation system. Hence, automatic frequency response control is not required. Therefore, at altitudes above 150 feet, switch S is manually or automatically operated so as to disconnect resistor 35 from the cathode circuit, thereby causing the actual bias voltage applied to tubes 25 and 26 to rise beyond cutoff and effectively removing filter 20 from the circuit.

The control grid circuit of reactance tube 25 is fed with voltage from the plate circuit thereof through a ninety-degree phase shifting network including capacitor 36 and resistor 37, while the ninety-degree phase shifting network for reactance tube 26 comprises capacitor 38 and resistor 39. The impedance looking into the plate circuit of reactance tubes 25 and 26 is thus very nearly a pure capacitive reactance. The effective value of the capacitive reactance of tubes 25 and 26 is directly proportional to the mutual conductance $g_m$ of the corresponding reactance tube and, therefore, directly dependent upon the grid voltage applied to said reactance tube.

The equivalent circuit of filter 20 is shown in Fig. 2 in which the elements corresponding to those of Fig. 1 are shown by the same reference numerals. This filter is seen to be a conventional two-section RC filter having series resistances 21 and 22 and shunt capacitances including the variable capacitances inherent in reactance tubes 25 and 26. The capacitor 42 represents the combined capacitance of capacitors 23 and 34 of Fig. 1. It should be understood that filter 20 may comprise any number of sections, depending largely upon the frequency response characteristics desired. For example, if a single section RC filter is desired, a single reactance tube is sufficient.

As is well known, the greater the shunt capacitance of an RC filter, the greater is the attenuation of the higher frequencies of a signal applied to the input of said filter because of the increased shunting effect of said capacitance.

At altitudes near zero, the negative output voltage from counter 40 is very small, causing reactance tubes 25 and 26 to be in their maximum conducting conditions. The equivalent capacitance of reactance tubes 25 and 26 and, therefore, the effective capacitance of RC filter 20 is comparatively large.

As the altitude increases, the magnitude of the negative output voltage from counter 40 increases the bias on reactance tubes 25 and 26, thereby reducing the transconductance $g_m$ of said tubes and causing a reduction in the effective capacity of each of said tubes. In this manner, the turnover frequency of filter 20 is made to rise with increasing altitude.

In Fig. 3, the resulting over-all frequency response curves of the audio amplifier at various altitudes is shown. As is seen from these curves, at altitudes below approximately thirty feet, where the largest amount of interference is encountered, the response of the amplifier is controlled to rise at approximately six db per octave up to the frequency of the altitude signal and then fall off above this frequency. Above thirty feet the audio frequency response control circuit is less effective, permitting the gain of the amplifier to rise to a higher frequency before dropping off.

As the altitude increases, the difference frequency increases and the negative output voltage from audio frequency response control counter 40 also increases. It is desirable, therefore, that the maximum frequency response be at a frequency substantially equal to the difference or beat frequency determined from the well-known altimeter equation. For example, as the altitude increases from thirty feet to forty-three feet, the frequency of maximum response increases from approximately 1.5 kc. to approximately 2.5 kc. The frequency response is thus adjusted by a filter 20 to be as near optimum as possible for the desired beat frequency signal so that the effects of spurious signals and interference signals will be greatly reduced, if not eliminated.

When the indicated altitude reaches 150 feet, switch S is opened, either manually or automatically, thereby disconnecting resistor 34 from the cathode circuit of reactance tubes 25 and 26. This causes the voltage at the cathodes of said tubes to rise to a value determined by voltage divider 32, 33 which is sufficient to bias the reactance tubes beyond cutoff and effectively remove filter 20 from the circuit. Thus, whenever the altitude indication is above 150 feet, the audio amplifier frequency response characteristic remains fixed, rising approximately six db per octave from 100 cycles to six kc. and then falling off rapidly. The curves shown in Fig. 3 are illustrative of equipment having certain predetermined values of modulating frequency and transmitter sweep width. Since these values differ from equipment to equipment, the curves will likewise vary to some extent.

While reactance tubes for varying the capacitance of filter 20 have been specifically described for controlling the frequency response of the filter-amplifier circuit, it should be realized that variable resistance tubes may be substituted for the fixed resistors in filter 20 to obtain the desired variation in frequency response.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A frequency modulated device for measuring the distance between a body carrying said device and a reflecting surface comprising means for deriving a signal whose frequency is indicative of the distance between said body and said reflecting surface, means for amplifying said signal, means responsive to said amplifying means for producing a voltage whose magnitude is proportional to the frequency of said signal, said amplifying means including a variable low-pass resistance-capacitance filter network for providing a maximum response at the frequency of said signal and having a resistor connected in series with said amplifying means and an electron discharge device connected in parallel with said resistor, said electron discharge device having an input circuit continuously receptive of said voltage, the effective capacitive reactance interposed by said electron discharge device being a direct function of the magnitude of said voltage.

2. A frequency modulated device for measuring the distance between a body carrying said device and a reflecting surface comprising means for deriving a signal whose frequency is indicative of the distance between said body and said reflecting surface, means for amplifying said signal, means responsive to said amplifying means for producing a voltage whose magnitude is proportional to the frequency of said signal, said amplifying means including a resistance-capacitance filter comprising a plurality of series resistors and a plurality of reactance tube electron discharge devices connected across said corresponding resistances, means for continuously connecting said voltage to said electron discharge devices to effect a continuous variation in capacitance of said filter and a variation in the frequency response of said amplifying means as a function of said voltage.

3. A frequency modulated device for measuring the distance between a body carrying said device and a reflecting surface comprising means for deriving a signal whose frequency is indicative of the distance between said body and said reflecting surface, means for amplifying said signal, means responsive to said amplifying means for producing a voltage whose magnitude is proportional to the frequency of said signal, said amplifying means including a resistance-capacitance filter comprising a series resistor shunted by an electron discharge device having at least an anode, a cathode and a control electrode, means for connecting said anode to said resistor, and circuit means for continuously connecting said voltage to said grid-cathode circuit of said electron discharge device, said circuit means being adapted to vary continuously the transconductance of said electron discharge device and the effective capacitance in shunt with said resistor as a function of the magnitude of said voltage.

References Cited in the file of this patent

UNITED STATES PATENTS

| | | |
|---|---|---|
| 2,206,903 | Lane | July 9, 1940 |
| 2,280,109 | Varela | Apr. 21, 1942 |
| 2,407,644 | Benioff | Sept. 17, 1946 |
| 2,455,693 | Mercer | Dec. 7, 1948 |
| 2,490,816 | Kiebert | Dec. 13, 1949 |